United States Patent [19]

Barbeau

[11] Patent Number: 4,769,996
[45] Date of Patent: Sep. 13, 1988

[54] FUEL TRANSFER SYSTEM FOR MULTIPLE CONCENTRIC SHAFT GAS TURBINE ENGINES

[75] Inventor: Dennis E. Barbeau, Carefree, Ariz.

[73] Assignee: Teledyne Industries, Inc., Los Angeles, Calif.

[21] Appl. No.: 6,748

[22] Filed: Jan. 27, 1987

[51] Int. Cl.[4] .............................................. F02C 1/00
[52] U.S. Cl. ................................... 60/745; 60/39.161
[58] Field of Search ............ 60/745, 740, 734, 39.161, 60/741, 744

[56] References Cited

U.S. PATENT DOCUMENTS

| | | |
|---|---|---|
| 2,538,179 | 1/1951 | Weinhardt . |
| 3,182,453 | 5/1965 | Probert et al. ......................... 60/745 |
| 3,204,408 | 9/1965 | Vincent . |
| 3,469,396 | 9/1969 | Onishi et al. . |
| 3,932,988 | 1/1976 | Beaufrere ............................... 60/737 |
| 4,110,974 | 9/1978 | Herman ................................. 60/745 |
| 4,188,780 | 2/1980 | Penny . |

FOREIGN PATENT DOCUMENTS 853108 11/1960 United Kingdom ................... 60/745

Primary Examiner—Louis J. Casaregola
Assistant Examiner—Timothy S. Thorpe
Attorney, Agent, or Firm—Gifford, Groh, VanOphem, Sheridan, Sprinkle and Dolgorukov

[57] ABSTRACT

A fuel pumping and transfer system for a multiple concentric shaft gas turbine engine which has the capability to handle contaminated or slurry fuels. The fuel is introduced into the innermost shaft at any desired low pressure thereby eliminating the need for a high pressure fuel pump. Fuel is introduced through a rotating fuel tube disposed within the inner shaft of the engine. The centrifugal force caused by rotation of the shafts causes the fuel to be collected against the inner wall of the shaft creating a centrifugal pressure dam. As the fuel passes from one collection region to the next the differential pressure between the inner shaft region and the combustor increases sufficiently to provide proper combustion.

11 Claims, 1 Drawing Sheet

U.S. Patent  Sep. 13, 1988  4,769,996 ent transfer system for multiple concentric shaft gas turbine engines

BACKGROUND OF THE INVENTION

I. Field of the Invention

This invention relates to fuel pumping and transfer systems and, in particular, to a fuel transfer system for a multiple shaft gas turbine engine.

II. Background of the Invention

The slinger-type fuel injection system has been utilized in single spool trubine engines for many years. The slinger-type system has proven to have many advantages including low cost, the ability to handle contaminated and slurry fuels and the ability to promote stable combustion at extremely high altitudes where low pressure conditions exist. In the single spool engine, the slinger is part of the main shaft and supplies fuel by introducing the fuel to the interior of the turbine shaft for subsequent injection into the combustion chamber.

Despite the reliability of the slinger-type fuel injection system in single spool engines, similar systems do not provide the same advantages in multiple shaft engines. Most modern turbo-fan or turbo-shaft engines employ multiple shafts wherein a second shaft is internal to the mainshaft. In order to use a slinger-type fuel injection system, the known multiple shaft engines have required a stationary manifold external to the mainshaft of the engine. This manifold is supplied with fuel from tubing which passes through the engine combustion section.

The stationary manifold injects the fuel into a rotating manifold which is attached but external to the mainshaft.

Because of the added structure, the system introduces added costs. Moreover, the ability to handle contaminated slurry or low viscosity fuels is substantially reduced due to the requirement for small orifices in the stationary manifold. Additionally, with either the single shaft or multiple shaft turbine engines, a high pressure fuel pump is required to increase the fuel pressure to combustor entry pressure.

SUMMARY OF THE PRESENT INVENTION

The present invention overcomes the disadvantages of the prior known fuel systems by providing fuel pumping and transfer system for multiple shaft turbine engines which is capable of handling fuels having different viscosities.

The fuel system of the present invention generally includes a stationary fuel injector which introduces fuel to the inner side of the shaft as it rotates. The rotating motion of the shaft maintains the fuel on the inner wall until the centrifugal force causes the fuel to be slung-out through a plurality of circumferentially aligned holes in the shaft. A collector, which is secured to the outer shaft, collects the fuel discharged from the inner shaft. Thereafter, the centrifugal force caused by the rotating mainshaft forces the fuel into a collection compartment where it is subsequently discharged through injection holes formed in the mainshaft. The injection holes are the slinger injection holes which introduce highly atomized fuel into the combustor through the centrifugal force imparted by the rotating mainshaft.

The present invention therefore provides a low-cost fuel pumping and transfer system between shafts of a multiple concentric shaft engine which eliminates the cost and complexity of introducing the fuel to a stationary manifold in the combustion chamber which feeds the rotating fuel slinger. The fuel may be introduced into the center shaft at any desired pressure above vapor pressure thereby eliminating the requirement for a high pressure fuel pump.

Furthermore, the present system can be utilized to transfer fuel between any number of concentric shafts without the need to balance the pressures between the shafts or to seal between the shafts where the fuel is being transferred.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawings in which like reference characters refer to like parts throughout the several views and in which.

DETAILED DESCRIPTION OF A PREFERRED EMBODIMENT OF THE PRESENT INVENTION

Figure 1:
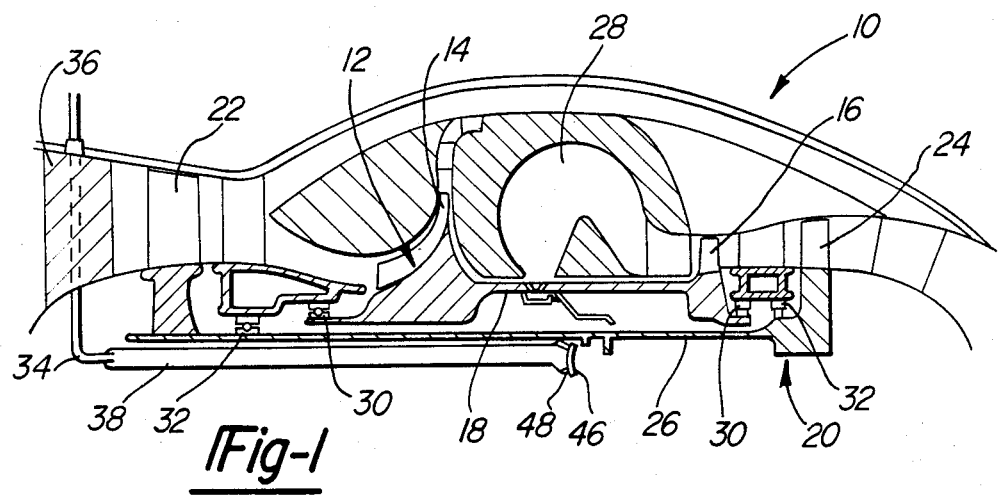
FIG. 1 is a cross-sectional perspective view of a multiple spool turbine engine embodying the present invention.

Referring generally to FIG. 1, there is shown a multiple concentric shaft turbine engine 10 embodying the present invention. Although it is to be understood that the invention may be employed with a turbine engine having any number of concentric shafts, the fuel transfer system of the present invention will be herein described in conjunction with a turbine engine 10 having two concentric shafts. The engine 10 includes a high pressure spool 12 having a compressor 14 driven by a turbine 16 through the main or outer shaft 18, and a low-pressure spool 20 having a compressor 22 driven by a turbine 24 through a secondary or inner shaft 26. As is shown in FIG. 1, the secondary shaft 26 is concentric to the main shaft 18. As is well known, the energy to drive the turbines 16 and 24 is provided through combustion of fuel in the combustion region 28. The high pressure or outer shaft 18 is supported by bearings 30 while the low pressure or inner shaft is supported by bearings 32.

Fuel for combustion by the turbine engine 10 is introduced into the fuel system through a fuel injector 34 which passes through the inlet strut 36 of the engine 10 and extends at least partially into a rotating fuel tube 38. The fuel tube 38 extends into the inner shaft 26 of the engine 10 and is secured to the inner shaft 26 such that the fuel tube 38 rotates with the shaft 26. As is best shown in FIG. 2, the fuel tube 38 is secured to the shaft 26 through an inwardly depending wall 40 thereby providing a damping chamber 42 between the fuel tube 38 and the inner turbine shaft 26.

Figure 2:
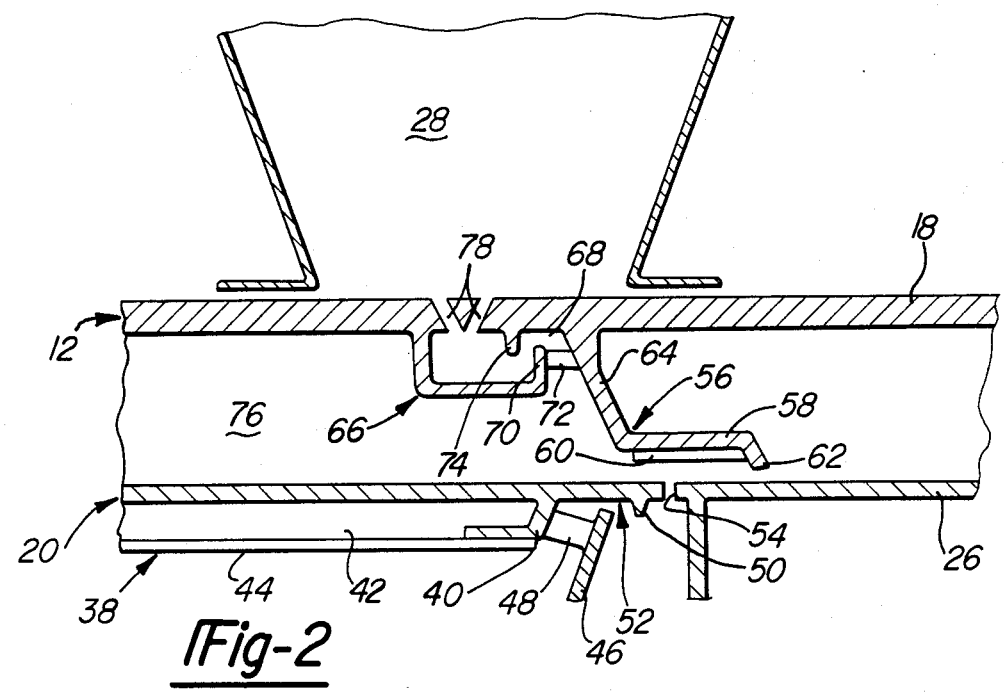
FIG. 2 is an enlarged cross-sectional perspective view of a portion of the turbine engine embodying the present invention.

Referring now to FIG. 2, once the fuel is introduced by the injector 34 into the fuel tube 38, the rotating motion of the shaft 26 and therefore the fuel tube 38 will cause the fuel to be slung-out against the inner wall 44 of the fuel tube 38 and to flow by centrifugal force along the wall 44 of the tube 38 towards the other end of the tube 38. The fuel is subsequently slung outwardly against the inner turbine shaft 26 by a baffle 46 and vane 48 arrangement formed at the end of the tube 38.

The baffle 46 blocks the end of the fuel tube 38 such that fuel leaving the tube 38 is slung-out directly to the inner shaft 26.

The vanes 48 are circumferentially spaced and extend between the end of the fuel tube 38 and the baffle 46. The plurality of vanes 48 ensures that the fuel is rotated by the motion of the inner shaft 26 in order to develop the necessary centrifugal force to project the fuel against the inner turbine shaft 26. However, these vanes 48 may be eliminated if the surface roughness of the fuel tube 38 and the shaft 26 are sufficient to impart the necessary friction to rotate the fuel.

Extending radially inwardly from the inner turbine shaft 26 is a dam 50 which extends circumferentially about the inner shaft 26. As can best be seen in FIG. 2, the inner diameter of the dam 50 is less than the outer diameter of the baffle 46 such that fuel slung-out by the baffle 46 contacts the shaft 26 between the dam 50 and the end of the fuel tube 38. As a result, a ring of fuel is trapped in the region 52 at a high pressure determined by the centrifugal force imparted by the rotation of the shaft 26. Thus, fuel can be introduced into the system at a low pressure and transferred through the system at a higher pressure.

As fuel is added to the region 52 it eventually spills over the dam 50 and is subsequently discharged through fuel discharge holes 54. The fuel discharge holes 54 comprise a plurality of circumferentially spaced passageways which extend through the inner turbine shaft 26. The number of holes 54 is not important as long as a sufficient number of holes 54 are provided to allow the necessary fuel flow through the shaft 26. Moreover, the fuel discharge holes 54 are larger than is actually necessary to pass the fuel threrethrough. This allows contaminant particles or solid fuel particles such as the type that would be found in slurry fuels to be passed through the fuel holes 54.

Referring still to FIG. 2, because of the centrifugal force imparted to the fuel by rotation of the inner turbine shaft 26, the fuel is discharged from the holes 54 at a high tangential velocity onto a collector dam 56 which is attached to or integrally formed with the outer turbine shaft 18. The collector dam 56 is disposed radially inwardly from the outer turbine shaft 18 and includes a collector portion 58 which is disposed parallel to both the inner and outer tubine shafts. In addition, the collector portion 58 of the dam 56 is disposed directly radially outwardly from the fuel discharge hole 54 such that the fuel discharged through the holes 54 is discharged onto the collector portion 58. As a result of the centrifugal force imparted on the fuel by the rotation of the shafts, the fuel adheres to the collector portion 58 to rotate the fuel thereby ensuring adherence. In the preferred embodiment, the collector 58 includes a plurality of vanes 60 which extend radially inwardly and longitudinally along the collector 58. Alternatively, the vanes 60 may be angles such that they collect the fuel and change its rotational momentum in turbine engines where the shafts are rotating in opposite directions. Finally, the collector dam 56 also includes a flange portion 62 which extends inwardly at an angle to the remote end of the collector dam 56 to prevent fuel flow past the end of the collection dam 56.

Fuel is transferred from the collector portion 58 of the collector dam 56 by being forced outwardly along the inwardly extending wall 64 of the collector dam 56 and towards a collection housing 66. The collection housing 66 is formed integrally with the outer turbine shaft 18 and is a substantially tubular housing which extends circumferentially along the inner wall of the outer turbine shaft 18. The housing 66 includes a fluid passageway 68 through which fuel from the collector dam 56 is transferred. The fluid passageway 68 is defined by the outer turbine shaft 18 and an outwardly depending portion 70 of the housing 66. In the preferred embodiment, a plurality of vanes 72 are provided in the fluid passageway 68 in order to impart additional centrifugal force on the fuel entering the fluid passageway 68. These vanes 72 are circumferentially spaced parallel to the outer turbine shaft 18 and extend between the collection housing 66 and the collection dam 56 such that fuel travelling along the wall 64 must pass through the vanes 72. However, these vanes 72 may be eliminated if the surface roughness of the collector dam 56 and the inner surface of the outer turbine shaft 18 are sufficient to impart the necessory friction to increase the pressure of the fuel in the passageway 68.

Extending radially inwardly from the outer turbine shaft 18 is a fluid dam 74 which extends circumferentially about the outer shaft 18. The fluid dam 74 is disposed within the housing 66 and has an inner diameter which is less than the outer diameter of the housing wall 70, thereby causing a ring of fuel to be trapped in the region 68 of the passageway. This ring of fuel is rotated to the rotational speed of the outer turbine shaft 18 by the friction of the walls of the shaft 18 and the limited passageway between the fluid dam 74 and the housing wall 70. The ring of fuel in the region 68 provides a pressure dam by virtue of its centrifugally generated pressure. This pressure dam allows a significant differential in pressure between the region 76 and the combustion region 28.

As fuel is added to the passageway region 68, it eventually spills over the dam 74 and is subsequently discharged through slinger discharge passageway 78. These passageways 78 allow transfer of the fuel from the collection housing 66 into the combustion region 28. Although any configuration may be utilized, these slinger passageways 78 are preferably disposed in pairs and extend through the outer turbine shaft 18 at divergent angles in order to introduce highly atomized fuel into the combustion region 28 through the centrifugal force imparted by the rotation of the shaft 18. Moreover, these passageways 78 are large enough to pass fuel which may contain contaminants or solid particles such as slurry fuels.

Operation of the fuel transfer system provides a low cost pumping system which allows fuel to be introduced into the turbine engine 10 at any desired low pressure above fuel vapor pressure. This eliminates the need for a high pressure fuel pump as is required by prior known fuel injection and slinger systems. Moreover, the fuel can be introduced at either end of the turbine engine 10 into the inner turbine shaft 26 simply by reversing the position of the rotating fuel tube 38. This eliminates the cost and complexity of introducing the fuel to a stationary manifold.

Furthermore, although the present invention has been described in conjunction with a turine engine having only two concentric shafts, the fuel can be transferred through any number of concentric shafts without requiring balancing of the pressures between the shafts. Finally, no seals are necessary between the shafts where the fuel is being transferred because the pressure dams which are created in each of the collection regions.

The foregoing detailed description has been given for clearness of understanding only and no unnecessary limitations should be understood therefrom as some modifications will be obvious to those skilled in the art without departing from the scope of the appended claims.

I claim:

1. A fuel pumping and transfer system for a turbine engine having a combustion region, said fuel system comprising:

a housing;

a first spool having an inner shaft rotatably mounted to said housing, said inner shaft having at least one discharge hole and an inner surface defining a central bore;

a fuel tube extending axially within said central bore and mounted to said inner shaft for rotation with said inner shaft, said fuel tube having a first end and a second end, said second end of said pair of ends being adjacent said at least one discharge hole;

means for supplying fuel to said fuel tube, said means for supplying in flow communication with said first end of said fuel tube, said fuel tube delivering said fuel to said second end of said fuel tube by centrifugal force when said inner shaft is rotated;

means for discharging fuel from said second end of said fuel tube through said at least one discharge hole of said inner shaft, said means for discharging comprising a baffle mounted opposite said second end of said fuel tube and a dam extending radially inwardly from said inner surface of said inner shaft, said dam disposed intermediate said at least one discharge hole and said baffle whereby a ring of fuel is trapped by said dam is increase the pressure of said fuel prior to being discharged through at least one discharge hole;

a second spool rotatably mounted to said housing, said second spool independently rotatable with respect to said inner shaft and having an outer shaft extending coaxially with and spaced apart from said inner shaft, said outer shaft having a collector dam mounted to said outer shaft and extending radially inwardly from said outer shaft, said collector dam having an elongated portion extending opposite said at least one of discharge hole of said inner shaft whereby said collector dam collects fuel discharged from said at least one discharge hole; and means for transferring fluid collected by said collector dam of said outer shaft to said combustion region of said turbine engine, said transferring means comprising a collection housing and a plurality of slinger discharge passageways formed in said outer shaft whereby fuel from said collector dam is communicated to said collector housing and expelled through said plurality of slinger passageways by centrifugal force.

2. The fuel system as defined in claim 1 wherein said means for supplying fuel comprises a stationary fuel injector extending partially into said fuel tube.

3. The fuel system as defined in claim 1 wherein said means for discharging includes a plurality of circumferentially spaced vanes extending between said baffle and said fuel tube.

4. The fuel system as defined in claim 1 wherein the inner diameter of said dam is less than the outer diameter of said baffle.

5. The fuel system as defined in claim 4 wherein said slinger discharge passageway are disposed in pairs, said pairs of slinger discharge passageways extending from said collection housing to said combustion region at divergent angles.

6. The fuel system as defined in claim 1 wherein said collector dam includes a plurality of longitudinal vanes extending radially inwardly from said collector dam.

7. The fuel system as defined in claim 6 wherein said collector dam includes a flange portion portion extending inwardly at an angle from a remote end of said collector dam wherein said flange prevents fuel transfer past said remote end of said collector dam.

8. The fuel system as defined in claim 1 wherein said collection housing is a substantially tubular housing extending circumferentially about said outer turbine shaft and extending radially inwardly from the inner surface of said outer shaft.

9. The fuel system as defined in claim 8 wherein said collection housing includes a fluid passageway from said collection dam to an interior region of said collection housing.

10. The fuel system as defined in claim 9 wherein said fluid passageway includes a plurality of vanes extending across said passageway between said collection housing and said collector dam.

11. The fuel system as defined in claim 9 wherein said collection housing includes a fluid dam extending radially inwardly from said outer shaft into said collection housing and disposed intermediate said fluid passageway and said plurality of slinger discharge passageways.

* * * * *